United States Patent
Ugajin

(10) Patent No.: US 9,415,605 B2
(45) Date of Patent: Aug. 16, 2016

(54) LASER MARKING APPARATUS

(71) Applicant: Nidec Copal Corporation, Tokyo (JP)

(72) Inventor: Tomohisa Ugajin, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 14/633,258

(22) Filed: Feb. 27, 2015

(65) Prior Publication Data

US 2015/0273860 A1    Oct. 1, 2015

(30) Foreign Application Priority Data

Feb. 28, 2014   (JP) ................................ 2014-039311

(51) Int. Cl.
| | | |
|---|---|---|
| *B41J 2/44* | (2006.01) | |
| *B41J 11/00* | (2006.01) | |
| *B41J 13/08* | (2006.01) | |
| *B65G 15/00* | (2006.01) | |

(52) U.S. Cl.
CPC .. *B41J 2/442* (2013.01); *B41J 2/44* (2013.01); *B41J 11/007* (2013.01); *B41J 13/08* (2013.01); *B65G 15/00* (2013.01)

(58) Field of Classification Search
CPC ........ B65G 15/64; B65G 39/16; B65G 47/64; B65G 47/647; B65G 47/648; B23Q 3/155; B23Q 3/157
USPC .......... 347/224, 225, 262, 264; 271/225, 230, 271/264
See application file for complete search history.

(56) References Cited

U.S. PATENT DOCUMENTS

| | | | | |
|---|---|---|---|---|
| 3,587,826 A | * | 6/1971 | Severson | B65H 29/60 198/369.2 |
| 5,664,772 A | * | 9/1997 | Auerbach | B65H 5/025 271/184 |
| 6,126,162 A | * | 10/2000 | Ueda | B65H 29/242 271/198 |
| RE38,867 E | * | 11/2005 | Kusters | B65H 5/025 271/183 |
| 8,480,079 B2 | * | 7/2013 | Sugano et al. | 271/225 |
| 8,579,283 B2 | * | 11/2013 | Isobe | B65H 5/26 271/177 |

FOREIGN PATENT DOCUMENTS

JP        2013-244692        12/2013

* cited by examiner

*Primary Examiner* — Lisa M Solomon
(74) *Attorney, Agent, or Firm* — Troutman Sanders LLP

(57) ABSTRACT

The laser marking apparatus includes: a laser device; a first conveying portion that conveys an illuminated object to at least a region illuminated by a laser beam through the laser device; a second conveying portion, provided on an upstream side of the first conveying portion, able to convey the illuminated object in a direction that is essentially perpendicular to that of the first conveying portion; a switching mechanism, provided between the first conveying portion and the second conveying portion, which switches a conveyance destination of the illuminated object to the first conveying portion or the second conveying portion; and an imaging portion, provided in a vicinity of the second conveying portion, that captures an image of the illuminated object that is conveyed by the second conveying portion.

3 Claims, 7 Drawing Sheets

LASER MARKING APPARATUS

CROSS REFERENCE TO RELATED APPLICATION

This application claims priority under 35 U.S.C. §119 to Japanese Patent Application No. 2014-039311, filed on Feb. 28, 2014, the entire content of which being hereby incorporated herein by reference.

FIELD OF TECHNOLOGY

The present invention relates to a laser marking apparatus.

BACKGROUND

There are known laser markers (laser marking apparatuses) for printing onto paper sheets through illumination with a laser beam. See, for example, Japanese Unexamined Patent Application Publication No. 2013-244692. Moreover, there are known laser marking apparatuses for carrying out marking through illumination with a laser beam at prescribed positions on an illuminated object, using as a reference, an image that is pre-printed on the illuminated object such as, for example, a paper sheet. In this laser marking apparatus, an image that is pre-printed onto an illuminated object 7, prior to marking, is imaged using an imaging portion to specify the position of the image, after which that image position is used as a reference when marking prescribed positions on the illuminated object.

In a typical laser marking apparatus, illustrated in FIG. 7, an imaging portion B40 is disposed on the upstream side, in the conveying direction, of a conveying portion B61 that conveys the illuminated object 7 in the horizontal direction, and further toward the upstream side than an illuminated region 10R that is illuminated by the laser device 10, where the imaging portion B40 captures an image of the illuminated object 7 on the conveying portion B61. In the example illustrated in FIG. 7, the imaging portion B40 is arranged lined up in the vicinity of the laser device 10. This laser marking apparatus has a paper sheet inverting mechanism B63 for flipping the paper sheet so as to carry out laser marking on the front and back faces of the paper sheet. The imaging portion B40 is disposed on the upstream side of the paper sheet inverting mechanism B63.

However, in the laser marking apparatus illustrated in FIG. 7, because, in order to image the illuminated object 7 on the upstream side of the conveying portion B61, the imaging portion B40 is disposed in the vicinity of the laser device 10, the length in the conveying correction is relatively long, causing the footprint of the laser marking apparatus to be relatively large.

In the present invention, the handling of such problems is one example of the problem to be solved. An aspect of the present invention is, for example, to provide a small laser marking apparatus with a simple structure and a small footprint.

SUMMARY

In order to achieve such an aspect, the imaging device according to the present invention is provided with, at least, the following structures: a laser marking apparatus for using, as a reference, an image that is printed on an illuminated object or an edge of the illuminated object to carry out marking through illuminating, with a laser beam, a prescribed position on the illuminated object, the laser marking apparatus including: a laser device; a first conveying portion that conveys the illuminated object to at least a region illuminated by the laser beam through the laser device; a second conveying portion, provided on the upstream side of the first conveying portion, able to convey the illuminated object in a direction that is essentially perpendicular to that of the first conveying portion; a switching mechanism, provided between the first conveying portion and the second conveying portion, which switches the conveyance destination of the illuminated object to the first conveying portion or the second conveying portion; and an imaging portion, provided in the vicinity of the second conveying portion, which captures an image of the illuminated object that is conveyed by the second conveying portion.

The present invention makes it possible to provide a small laser marking apparatus with a simple structure and a small footprint.

BRIEF DESCRIPTIONS OF THE DRAWINGS

DETAILED DESCRIPTION

Examples according to the present invention will be explained below in reference to the drawings. While the examples according to the present invention include the details that are illustrated, there is no limitation thereto. Note that in the explanations of the various drawings below, those parts that are the same as parts that have already been explained are assigned identical codes, and portions of redundant explanations are omitted.

Figure 1:
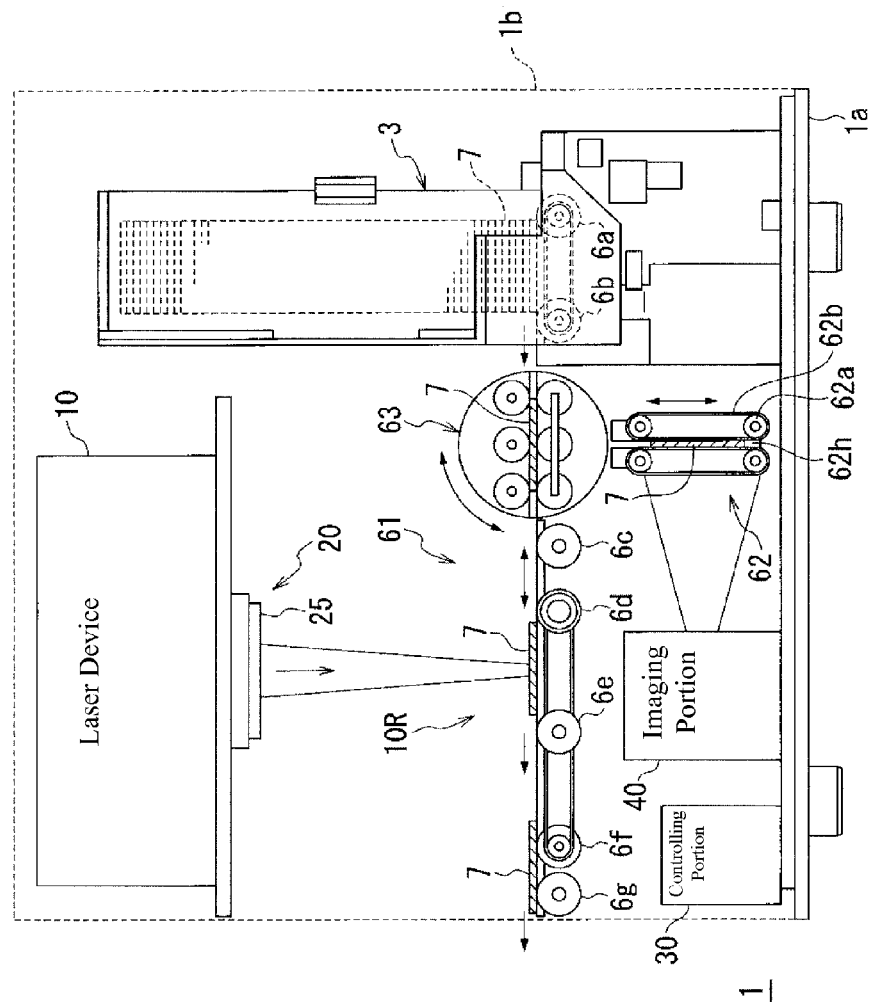
FIG. 1 is a diagram illustrating one example of a laser marking apparatus according to an example according to the present invention.
Figure 2:
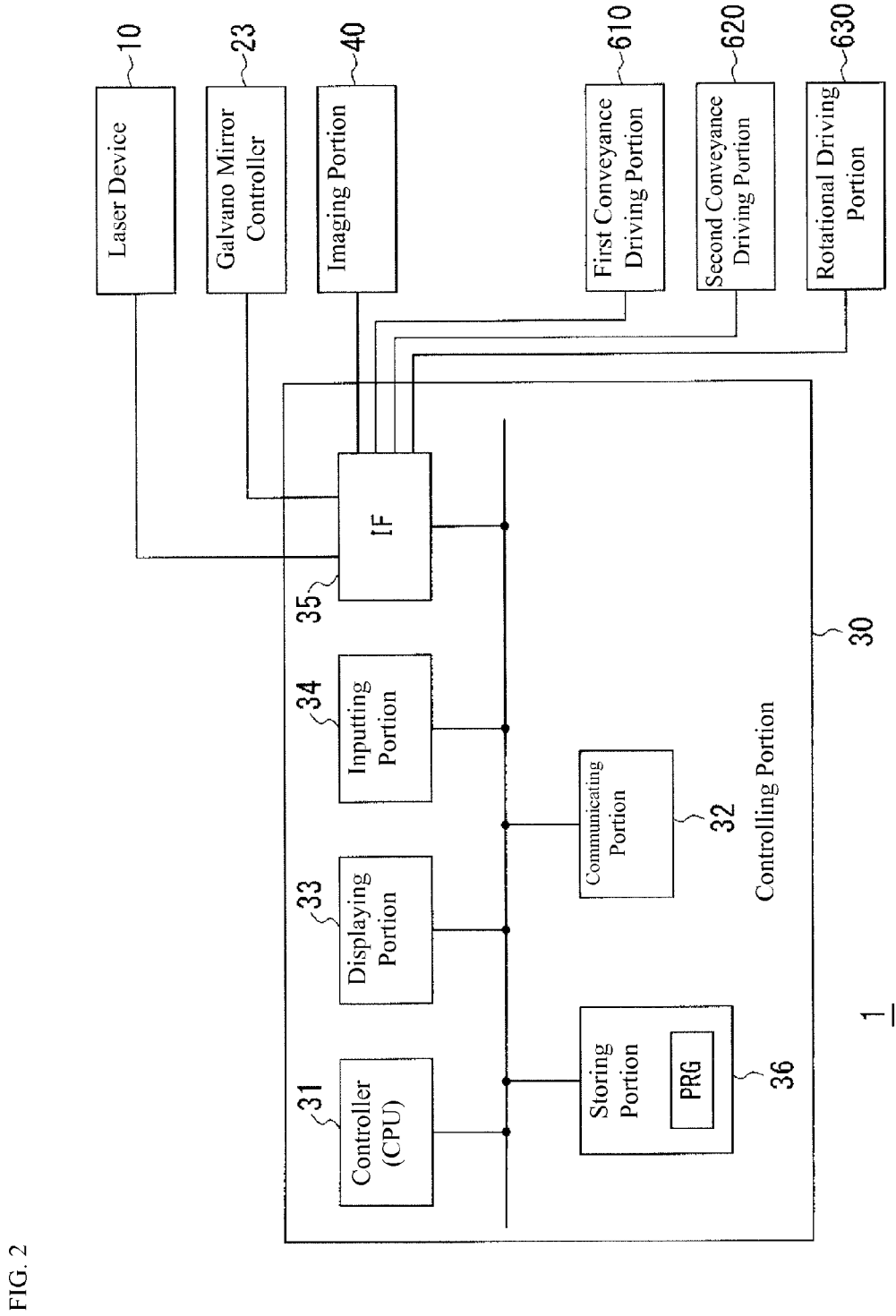
FIG. 2 is a functional block diagram illustrating one example of a laser marking apparatus according to an example according to the present invention.
Figure 3:
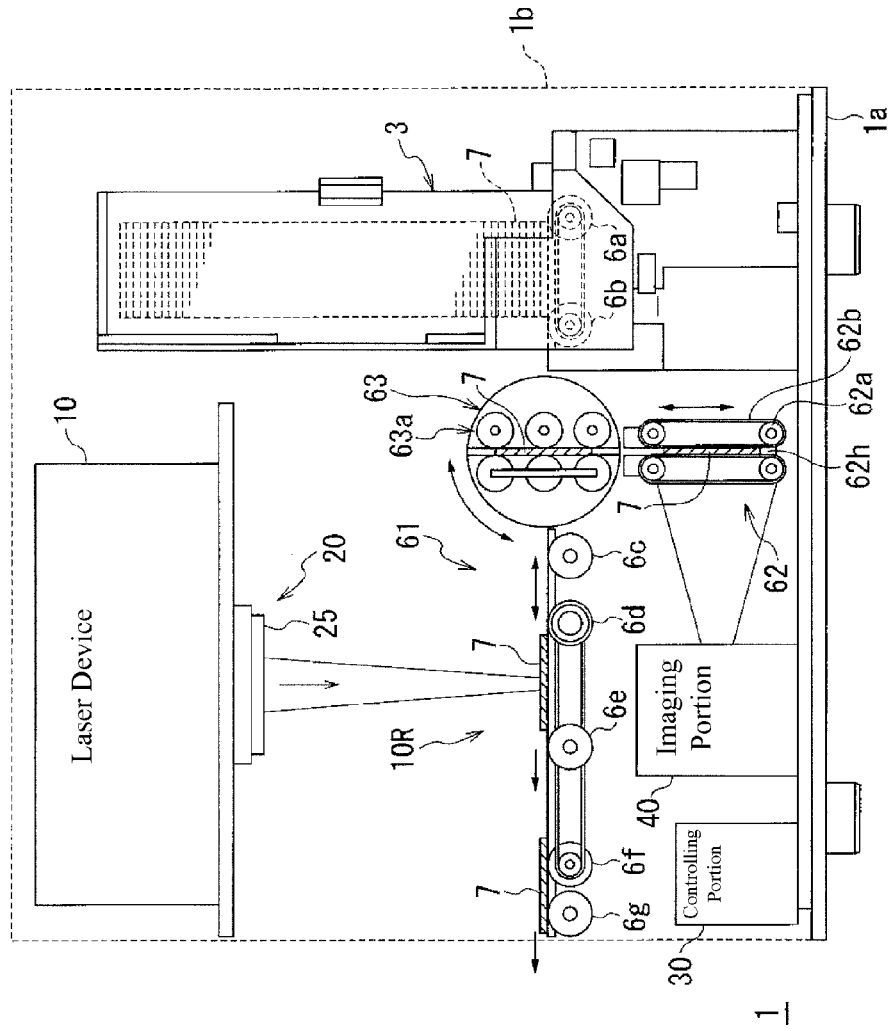
FIG. 3 is a diagram illustrating one example of operation of the laser marking apparatus used in FIG. 1.
Figure 4:
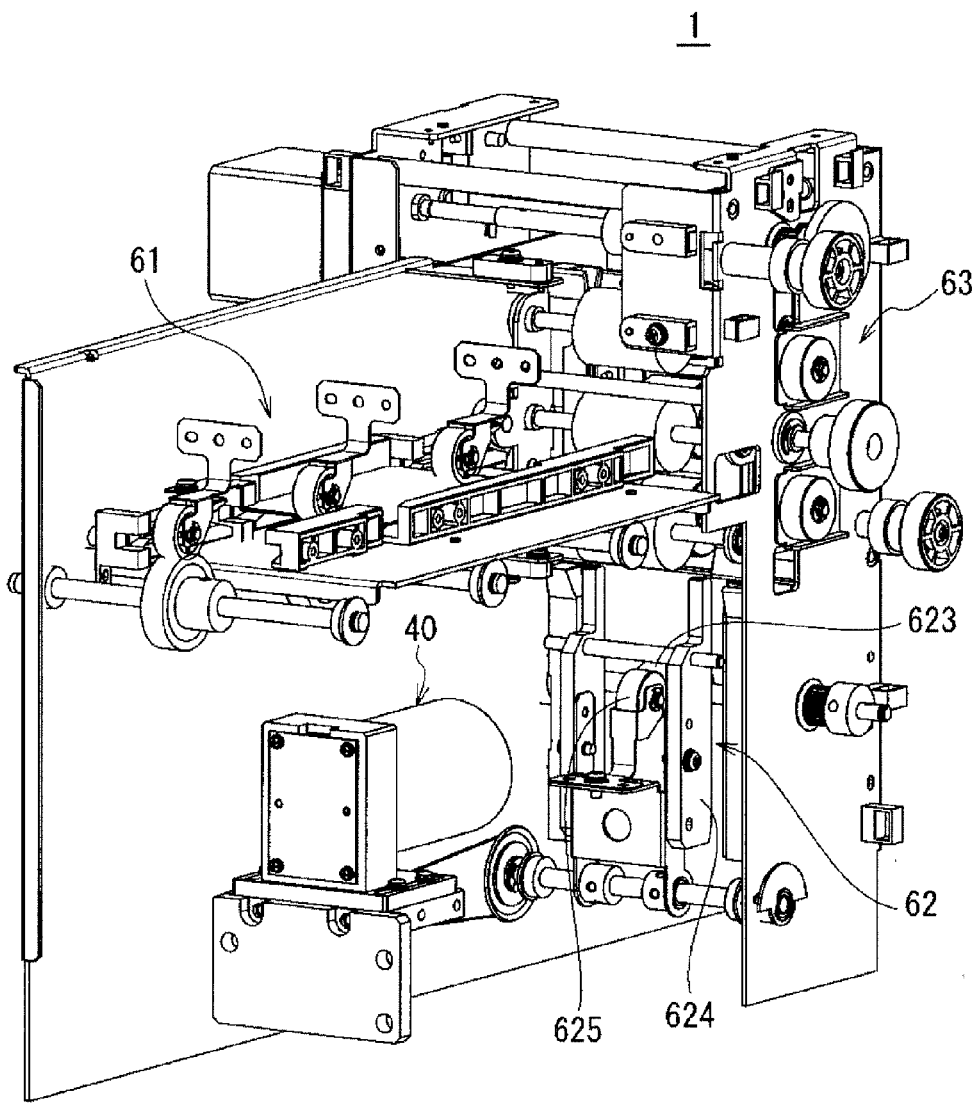
FIG. 4 is a perspective diagram illustrating one example of the critical portions of a laser marking apparatus according to an example according to the present invention.
Figure 5:
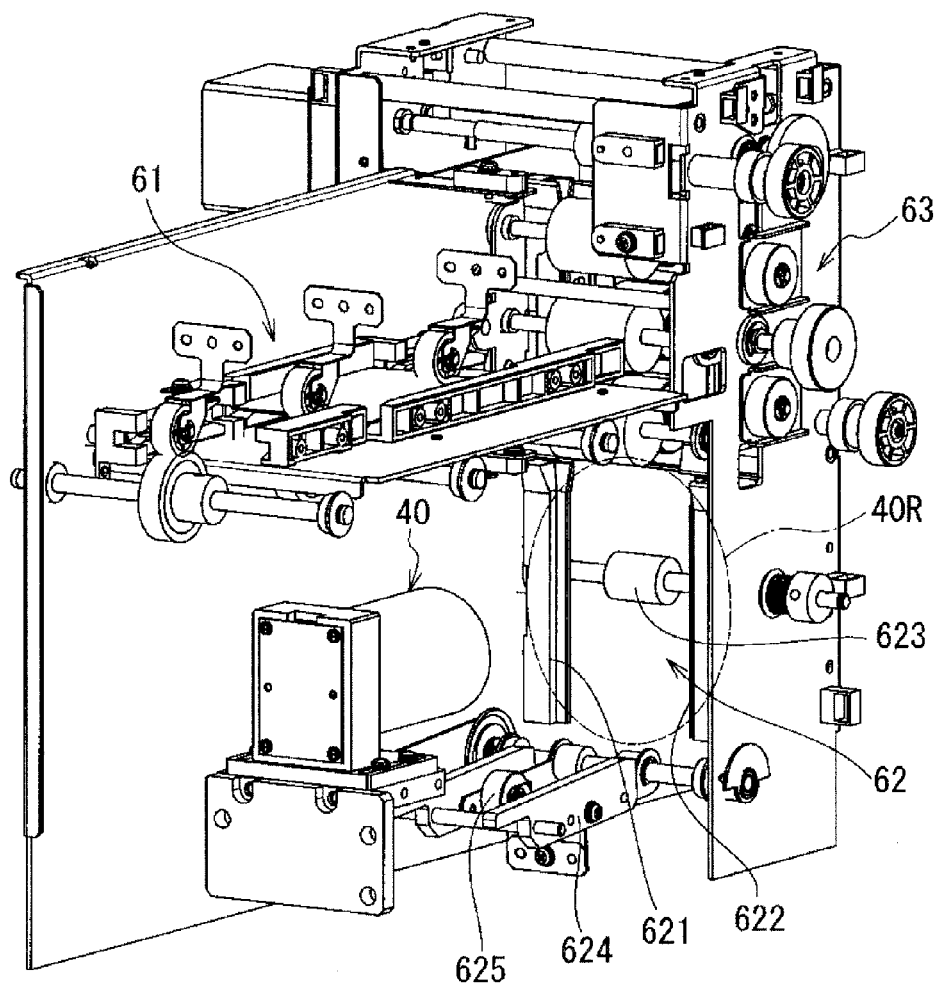
FIG. 5 is a perspective diagram illustrating one example of the critical portions of a laser marking apparatus wherein the second conveying portion is in the open state.
Figure 6:
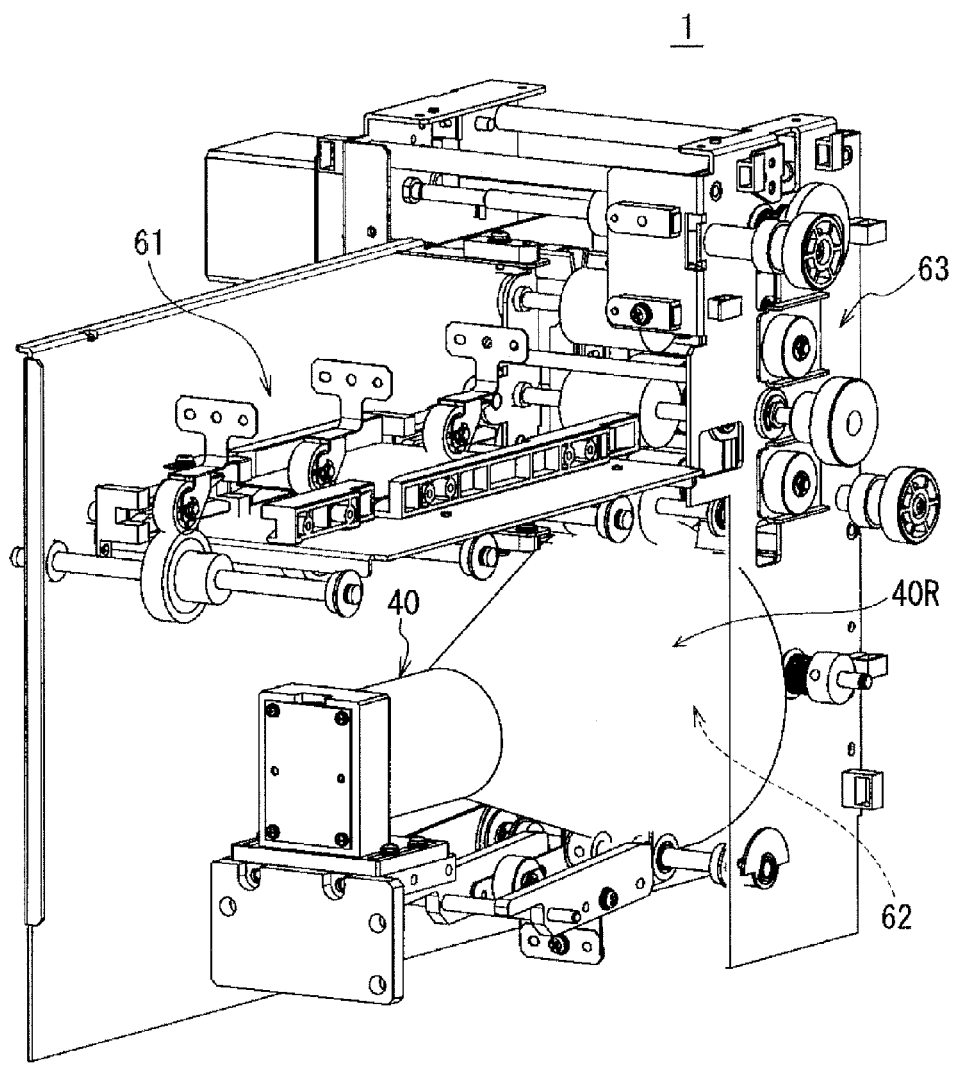
FIG. 6 is a perspective diagram for explaining one example of the imaging range by the imaging portion in the laser marking apparatus illustrated in FIG. 4.
Figure 7:
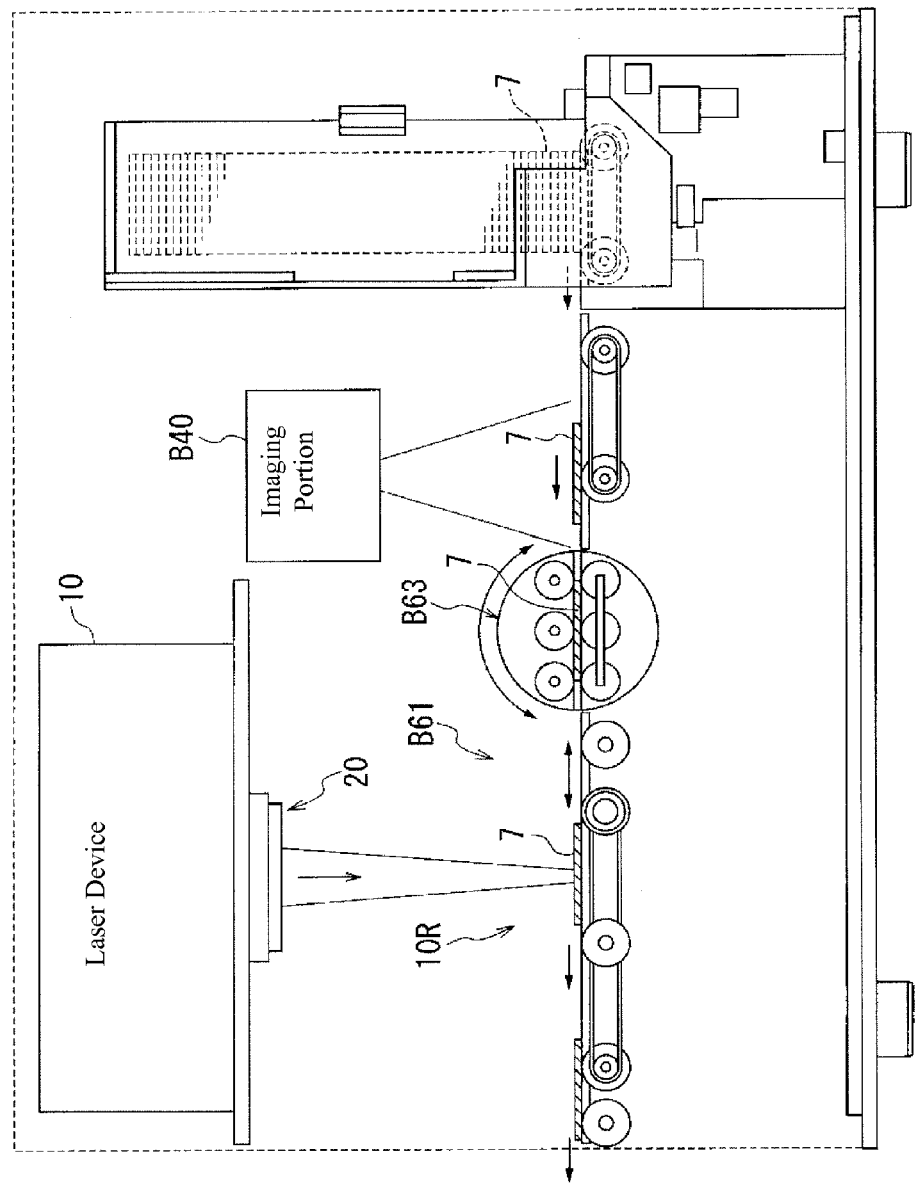
FIG. 7 is a diagram illustrating one example of a conventional laser marking apparatus.

FIG. 1 is a diagram illustrating one example of a laser marking apparatus 1 according to an example according to the present invention. In FIG. 1, the upstream side of the conveying route by the first conveying portion 61 is shown on the right side, and the downstream side is shown on the left side. FIG. 2 is a block diagram illustrating a laser marking apparatus 1. FIG. 3 is a block diagram illustrating one example of operation of a laser marking apparatus 1. FIG. 4 is a perspective diagram illustrating one example of the critical portions of a laser marking apparatus 1 according to an example according to the present invention. FIG. 5 is a perspective diagram illustrating one example of the critical portions of a laser marking apparatus 1 wherein the second conveying portion 62 is in the open state. FIG. 6 is a perspective diagram for explaining one example of the imaging range 40R by the imaging portion 40 in the laser marking apparatus 1 illustrated in FIG. 4.

The laser marking apparatus 1 according to the example according to the present invention has a mechanism for inverting a card-shaped illuminated object 7, such as a paper sheet, to perform marking, through illumination with a laser beam, the front and/or back face of the illuminated object 7, such as a paper sheet. Moreover, the laser marking apparatus 1 has an imaging portion 40 for capturing an image of the illuminated object 7, where an image that is printed in advance onto the illuminated object 7, or an edge of the illuminated object 7, is used as a reference to mark the illuminated object 7 through illuminating prescribed positions thereof with a laser beam. The structural elements of the laser marking apparatus 1 will be explained in detail below.

The laser marking apparatus 1, for example, exposes prescribed positions of the illuminated object 7 (the exposed object) using a pulsed laser beam, doing so on a pixel-by-pixel basis, by scanning one line at a time using a rastering method based on image data for marking using a laser beam. A prescribed material, such as a resin card that contains carbon, may be employed as the illuminated object 7.

The laser marking apparatus 1 has a laser device 10, an exposure optics system 20, a controlling portion 30, a first conveying portion 61, a second conveying portion 62, a switching mechanism 63, an imaging portion 40, and the like. The laser device 10, the exposure optics system 20, the controlling portion 30, and so forth are contained within a case of the laser marking apparatus 1. The case is structured from a bottom portion 1a, a case 1b, and the like. The controlling portion 30 may be provided outside of the case.

The laser device 10 has, for example, a resonator, and outputs a strong pulsed laser beam by amplifying an excitation beam from a stimulating light source such as an LD (laser diode) or an LED (light-emitting diode).

The exposure optics system 20 illuminates, on a pixel-by-pixel basis, with the pulsed laser beam that is emitted from the laser device 10, prescribed positions of the illuminated object 7 (the exposed object), such as the resin card, through a rastering system, based on the image data.

The exposure optics system 20 has one or more galvano mirrors as a galvano scanner, an f0 lens 25, and the like.

The galvano mirrors have, for example, a galvano mirror for scanning in the X-axial direction, a galvano mirror for scanning in the Y-axial direction, and the like, and are driven and controlled by a galvano mirror controller 23 (a galvano mirror driving portion).

The f0 lens 25 is structured so as to focus, onto the illuminated object 7, the pulsed laser beam that is reflected by the galvano mirrors. For example, the f0 lens 25 is structured so as to scan, with a prescribed pitch on the focal plane of the illuminated object 7, the pulsed laser beam that is scanned with prescribed angles by the galvano mirror, or the like.

Note that while a galvano mirror and an f0 lens 25 are used as the scanning optics system for scanning the illuminated object 7 in the present example, there is no limitation to this form, but rather, for example, a polygonal mirror, or the like, may be used instead of the galvano mirror.

Moreover, while in the present example the laser marking apparatus 1 carries out the laser exposure while scanning the illuminated object 7 by individual pixels through a rastering system, in accordance with the image data, the movement of the galvano mirror may instead be controlled when scanning so as to skip the pixels for which laser exposure is not required, so as to move to the next pixel that requires the laser exposure.

The laser marking apparatus 1 according to the present example has a feeding portion 3 within the case. The feeding portion 3 may contain a plurality of card-shaped illuminated objects 7, enabling supplying of the illuminated objects 7 to the first conveying portion 61 when necessary.

The first conveying portion 61 conveys the illuminated object 7 in essentially the horizontal direction at least up until a region 10R that is illuminated by the laser beam by the laser device 10. In the present example, the illuminated object 7 is conveyed from the feeding portion 3 by rollers 6a and 6b through a switching mechanism 63 to the downstream side (the left side in FIG. 1), and then, after marking by the laser beam in the illuminated region 10R, is conveyed to a prescribed discharge opening. The first conveying portion 61 has rollers 6c, 6d, 6e, 6f, and 6g, a looped belt, and the like, which are driven by a driving portion, to convey the illuminated object 7 in the direction of conveyance.

The second conveying portion 62 is positioned on the upstream side of the first conveying portion 61, and is structured so as to convey the illuminated object 7 in a direction that is essentially perpendicular to that of the first conveying portion 61. In the present example, the second conveying portion 62 has a plurality of rollers 62a, a belt 62b, and the like, where gaps 62h are formed between the plurality of rollers 62a, structured so as to enable the card-shaped illuminated object 7 to be held therebetween, and structured to enable movement of the illuminated object 7 in the essentially perpendicular direction. Moreover, the second conveying portion 62 has, for example, guiding portions 621 and 622 for holding the card-shaped illuminated object so as to allow movement in the conveying direction, rollers 623 and 625 that can hold the illuminated object therebetween, and the like (referencing FIG. 4 and FIG. 5). A movable member 624 that is provided with a roller 625 has one end portion thereof borne by the case so as to enable rotation thereon, structured so as to be in a closed state when the illuminated object is conveyed (referencing FIG. 4) and to be in an open state during imaging by the imaging portion 40, and the like (referencing FIG. 5). For example, the imaging portion 40 is provided with an imaging range 40R so as to enable capturing of an image of the illuminated object that is conveyed by the second conveying portion 62 (referencing FIG. 6).

Moreover, the switching mechanism 63 is disposed between the first conveying portion 61 and the second conveying portion 62, structured so as to switch the illuminated object 7 to either the first conveying portion 61 or the second conveying portion 62. The switching mechanism 63, as the paper sheet inverting mechanism, is structured from, for example, a plurality of rollers 63a or a looped belt, or the like, wherein the illuminated object 7 that is positioned in a gap that is formed between the rollers 63a is held therebetween so as to be able to rotate, and has a structure for switching the conveyance destination for the illuminated object 7 and for rotating so as to invert the illuminated object 7. In the present example, this switching mechanism 63 uses, as the rotational axis, the horizontal axis that is perpendicular to the direction of conveyance, structured so as to enable rotation of the illuminated object 7 by a prescribed angle, such as 90°, in a specified direction or in the opposite direction therefrom (referencing FIG. 1 and FIG. 3). The switching mechanism 63 is driven rotationally by a motor (not shown), or the like.

The imaging portion 40 is disposed in the vicinity of the second conveying portion 62, to capture an image of the illuminated object 7 that is conveyed by the second conveying portion 62. More specifically, the imaging portion 40 is disposed in a location between the first conveying portion 61 and the second conveying portion 62, surrounded thereby.

Specifically, in the present example according to the present invention, the second conveying portion 62 is positioned on the upstream side of the first conveying portion 61, and is structured so as to be able to convey the illuminated object 7 in a direction that is essentially perpendicular, downward from the path of conveyance of the first conveying portion 61. Moreover, the imaging portion 40 is disposed so as to be positioned below the first conveying portion 61. Specifically, the path of conveyance of the first conveying portion 61 is disposed between the laser device 10 and the imaging portion 40. Moreover, in the example described above, the imaging portion 40 is disposed below the downstream side of the first conveying portion 61, structured so as to be able to capture an image of the illuminated object 7 that is conveyed by the second conveying portion 62, which is positioned on the upstream side of the first conveying portion 61.

The controlling portion 30 carries out the overall control of each structural element of the laser marking apparatus 1. The controlling portion 30 includes a controller 31 (a CPU), a communicating portion 32, a displaying portion 33, an inputting portion 34, an interface 35 (IF), a storing portion 36, and the like (referencing FIG. 2). Each structural element of the controlling portion 30 is connected so as to enable data communication through the communication lines, such as a bus, or the like.

The controller 31 (the CPU) carries out overall control of the various structural elements of the controlling portion 30 and of the laser marking apparatus 1. The controller 31 executes a program (PRG) that is stored in the storing portion 36 so as to achieve, in the laser marking apparatus 1, the functions relating to the present invention. Details of the operation of the controller 31 will be described below.

The communicating portion 32 carries out data communication with an external computer (PC), or the like, through a communication channel that may be of a wired type or a wireless type, under the control of the controller 31. This external computer is able to generate image data through, for example, operations by the user.

The displaying portion 33 is a displaying device, such as a liquid crystal panel displaying device, and displays information in accordance with the present invention under the control of the controller 31. The inputting portion 34 is an operation inputting device such as any of a variety of operating switches, buttons, or the like, and outputs, to the controller 31, signals in accordance with operations by the user. The interface 35 (IF) connects electrically the laser device 10, the galvano mirror controller 23, the imaging portion 40, a first conveyance driving portion 610, a second conveyance driving portion 620, a rotational driving portion 630, and the like. The controller 31 controls, through the interface 35, the laser device 10, the galvano mirror controller 23, the imaging portion 40, the first conveyance driving portion 610, the second conveyance driving portion 620, and the rotational driving portion 630.

The galvano mirror controller 23 controls driving of the galvano mirror through the control of the controller 31.

The first conveyance driving portion 610, through controlling the driving of the prescribed rollers of the first conveying portion 61, under the control of the controller 31, conveys the illuminated object 7 in a prescribed direction through driving of a motor, or the like. The second conveyance driving portion 620, through controlling the driving of the prescribed rollers of the second conveying portion 62 conveys the illuminated object 7 in a prescribed direction through driving of a motor, or the like. The rotational driving portion 630 controls the rotation of the switching mechanism 63 around a rotational axis that is the horizontal axis that is perpendicular to the direction of conveyance, and controls the direction of conveyance of the illuminated object 7, through driving a motor, or the like.

The storing portion 36 is a storing device such as a RAM, a ROM, or the like. The storing portion 36 stores, for example, a program (PRG) for controlling the laser marking apparatus 1.

The controller 31, at the time of a laser marking operation, causes the laser device 10 to emit to the pulsed laser beam.

An example of the operation of the laser marking apparatus 1 will be explained next. Note that in the feeding portion 3, images with common designs are pre-printed on the front and back faces of the card-shaped illuminated objects 7 in the feeding portion 3.

The controller 31 of the laser marking apparatus 1 drives the rollers 6a and 6b, for example, through a motor, or the like, to cause the card-shaped illuminated objects 7 to be fed one-at-a-time from the feeding portion 3.

At the beginning, the switching mechanism 63, as illustrated in FIG. 1, is in a state wherein the path of conveyance is arranged along the horizontal direction. The controller 31 causes the illuminated object 7 that is fed from the feeding portion 3 to be held and rotated by 90° to the left in FIG. 1 by the switching mechanism 63, and causes the illuminated object 7 to be conveyed to the second conveying portion 62 that is below.

The second conveying portion 62, under the control of the controller 31, moves the illuminated object 7 to the imaging position of the imaging portion 40 and stops it there. The controller 31 captures an image of the front of the illuminated object 7 and an image of the edge of the illuminated object 7 through the imaging portion 40. The controller 31 drives the second conveying portion 62 and the switching mechanism 63 to carry out a process wherein the illuminated object 7 is moved to the switching mechanism 63.

The controller 31 causes the illuminated object 7 to be held by the switching mechanism 63 and rotated by 90° to the right in FIG. 1. Following this, the rollers 6c, 6d, 6e, and the like of the first conveying portion 61 are driven to move the illuminated object 7 to the region 1 OR that is illuminated by the laser beam.

The controller 31 uses, as a reference, the image that is printed on the illuminated object 7, or the edge of the illuminated object 7, for which an image has been captured by the imaging portion 40, to adjust the angles of the galvano mirrors through the galvano mirror controller 23, to carry out marking by emitting the laser beam from the laser device 10 onto the prescribed position of the front surface of the illuminated object 7.

Following this, the controller 31 carries out control so as to mark the back face side of the illuminated object 7. Specifically, the controller 31 drives the rollers 6c, 6d, 6e of the first conveying portion 61, and the roller 63a, and the like, of the switching mechanism 63, to move the illuminated object 7 to the switching mechanism 63. The controller 31 causes the illuminated object 7 to be held and rotated by 90° to the right in FIG. 1 by the switching mechanism 63, and drives the roller 63a, the roller 62a, and the like, to cause the illuminated object 7 to be conveyed to the second conveying portion 62 that is below.

The second conveying portion 62, under the control of the controller 31, moves the illuminated object 7 to the imaging position of the imaging portion 40 and stops it there. The controller 31 captures an image of the front of the illuminated object 7 and an image of the edge of the illuminated object 7 through the imaging portion 40. The controller 31 drives the second conveying portion 62 and the switching mechanism 63 to carry out a process wherein the illuminated object 7 is moved to the switching mechanism 63.

The controller 31 causes the illuminated object 7 to be held by the switching mechanism 63 and rotated by 90° to the right in FIG. 1. Following this, the rollers 6c, 6d, 6e, and the like of the first conveying portion 61 are driven to move the illuminated object 7 to the region 1 OR that is illuminated by the laser beam.

The controller 31 uses, as a reference, the image that is printed on the illuminated object 7, or the edge of the illuminated object 7, for which an image has been captured by the imaging portion 40, to adjust the angles of the galvano mirrors through the galvano mirror controller 23, to carry out marking by emitting the laser beam from the laser device 10 onto the prescribed position of the back surface of the illuminated object 7.

The controller 31 drives the rollers 6d, 6e, 6f, 6g, and the like to convey the illuminated object 7, for which the front and back faces have been marked, to the downstream side of the first conveying portion 61, to cause the illuminated object 7 to be discharged from the prescribed discharge opening (not shown).

As explained above, the laser marking apparatus according to the example according to the present invention uses an image that is printed on the illuminated object 7, or an edge of the illuminated object 7, as a reference, to mark through illuminating a prescribed position of the illuminated object 7 with a laser beam. This laser marking apparatus 1 includes a laser device 10, a first conveying portion 61 for conveying the illuminated object 7 up to at least a region 10R that is illuminated by a laser beam from a laser device 10, a second conveying portion 62 that is able to convey the illuminated object 7 in a direction that is essentially perpendicular to that of the first conveying portion 61, positioned on the upstream side of the first conveying portion 61, a switching mechanism 63, disposed between the first conveying portion 61 and the second conveying portion 62, for switching the conveyance destination of the illuminated object 7 to the first conveying portion 61 or the second conveying portion 62, and an imaging portion 40, disposed in the vicinity of the second conveying portion 62, for capturing an image of the illuminated object 7 that is conveyed by the second conveying portion 62. The laser marking apparatus 1 has a controller 31, where the controller 31, uses as a reference, an image that is printed on the illuminated object 7, or an edge of the illuminated object 7, imaged by the imaging portion 40, to carry out marking by emitting a laser beam to a prescribed position on the illuminated object 7.

In this way, the imaging portion 40 is disposed so as to be able to capture an image of the illuminated object 7 that is conveyed by the second conveying portion 62, thus enabling the provision of a small laser marking apparatus 1 having a length that is relatively short in the direction of conveyance of the first conveying portion 61, having a simple structure, and having a small footprint. That is, the laser marking apparatus 1 is small, with a length that is relatively short in the direction of conveyance of the first conveying portion 61.

Moreover, in the laser marking apparatus 1 according to the example according to the present invention, the paper sheet inverting mechanism, as the switching mechanism 63, has a structure that holds the illuminated object 7 so as to enable rotation, and that switches the conveyance destination of the illuminated object 7 and inverts the illuminated object 7. That is, in the present example the switching mechanism 63 is provided with both a function for switching the conveyance destination of the illuminated object 7 to the first conveying portion 61 or the second conveying portion 62, and a function for inverting (flipping over) the illuminated object 7. For example, when compared to a laser marking apparatus (a comparative example) that is equipped with a separate device for switching the conveyance destination of the illuminated object 7 and a separate device for inverting (flipping over) the illuminated object 7, the switching mechanism 63 of the laser marking apparatus 1 according to the present invention, as described above, is provided with two functions, thus enabling the provision of a small laser marking apparatus 1.

In the example according to the present invention, the imaging portion 40 is disposed between the first conveying portion 61 and the second conveying portion 62, in a position that is surrounded thereby. Because the imaging portion 40 is disposed in this way, the laser marking apparatus 1 has a length that is relatively short in the direction of conveyance of the first conveying portion 61, and is small.

While examples according to the present invention were explained in detail above referencing the drawings, the specific structure is not limited to these examples, but rather design changes, and the like, within a range that does not deviate from the spirit and intent of the present invention are also included within the present invention. Furthermore, in the examples illustrated in the various drawings described above, the details that are set forth in the various drawings may be combined together insofar as there are no particular problems or contradictions with the purposes, structures, and the like, thereof. Moreover, the details set forth in the various drawings may form examples that are independent of each other, and the examples according to the present invention are not limited to a single example that combines the drawings.

While in the example set forth above the second conveying portion 62 was disposed below the switching mechanism 63, there is no limitation to this form. For example, the second conveying portion 62 may instead be disposed above the switching mechanism 63. In this case, the imaging portion 40 may be disposed in a position wherein it is possible to capture an image of the illuminated object 7 that is conveyed by the second conveying portion 62, in the vicinity of the second conveying portion 62, for example, it may be disposed above the first conveying portion 61.

Moreover, the first conveying portion 61, the second conveying portion 62, and the switching mechanism 63 are not limited to the example set forth above. They may use arbitrary structures insofar as the prescribed functions of the various structural elements are achieved.

The invention claimed is:

1. A laser marking apparatus for using, as a reference, an image that is printed on an illuminated object or an edge of the illuminated object to carry out marking through illuminating, with a laser beam, a prescribed position on the illuminated object, the laser marking apparatus comprising:
a laser device;
a first conveying portion that conveys the illuminated object to at least a region illuminated by the laser beam through the laser device;
a second conveying portion, provided on an upstream side of the first conveying portion, able to convey the illuminated object in a direction that is essentially perpendicular to that of the first conveying portion;
a switching mechanism, provided between the first conveying portion and the second conveying portion, which switches a conveyance destination of the illuminated object to the first conveying portion or the second conveying portion; and an imaging portion, provided in a vicinity of the second conveying portion, which captures an image of the illuminated object that is conveyed by the second conveying portion.

2. The laser marking apparatus as set forth in claim 1, wherein:

the switching mechanism has a rotatable structure that holds the illuminated object so as to be rotatable, switches the conveyance destination of the illuminated object, and inverts the illuminated object.

3. The laser marking apparatus as set forth in claim 1, wherein:

the imaging portion is provided between the first conveying portion and the second conveying portion, in a position that is surrounded thereby.

* * * * *